Nov. 29, 1966  C. S. OLSON  3,289,158
TURN SIGNAL WARNING DEVICE
Filed May 10, 1963
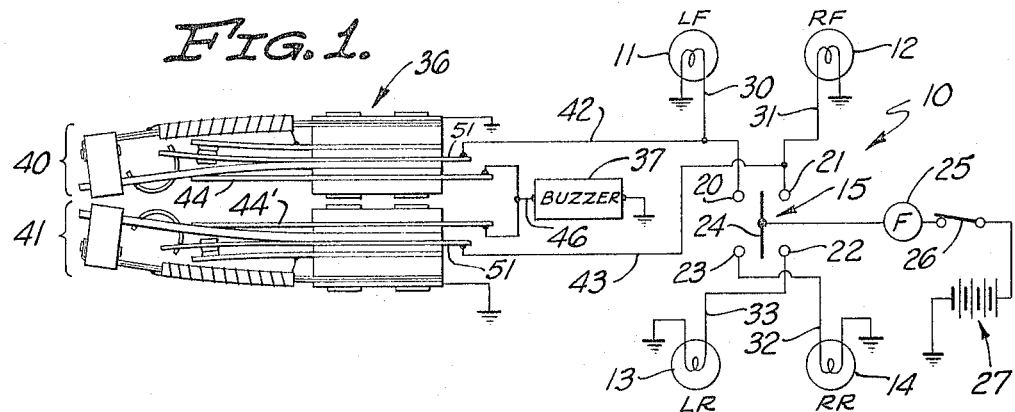
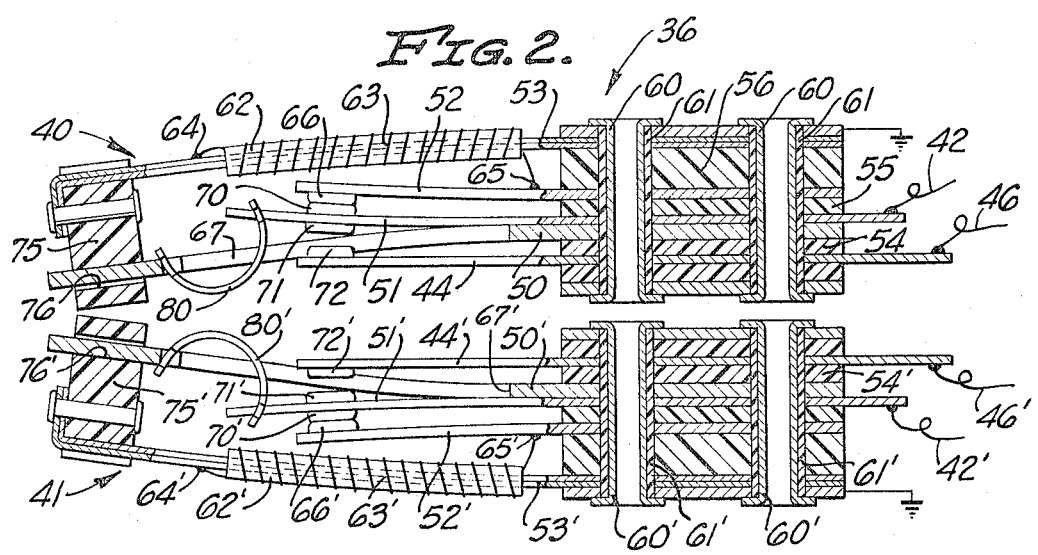
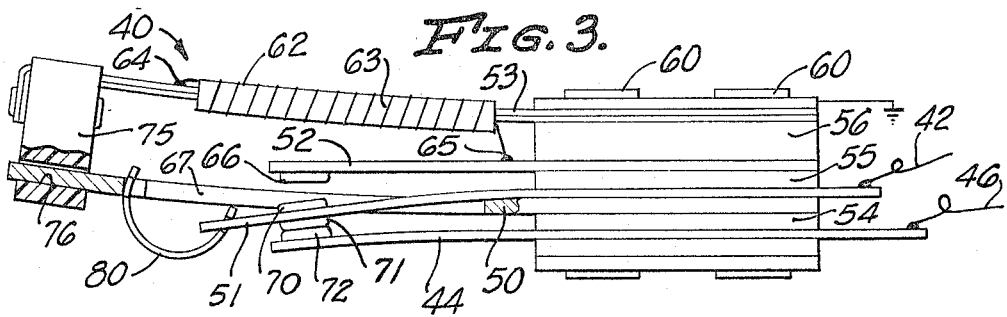
INVENTOR.
CLARENCE S. OLSON
BY Herbert E. Kidder
AGENT

United States Patent Office 3,289,158
Patented Nov. 29, 1966

3,289,158
TURN SIGNAL WARNING DEVICE
Clarence S. Olson, 947 E. Olive St., Colton, Calif.
Filed May 10, 1963, Ser. No. 279,489
3 Claims. (Cl. 340—75)

The present invention relates to directional turn signals for automobiles, and more specifically, to a device for alerting the driver to the fact that the turn signal lights are continuing to flash, although a longer-than-normal time has elapsed since the turn signal switch was activated. The invention is particularly useful where the driver has signalled for a turn and then changed his mind, without remembering to cancel the signaling device, or where a turn was so gentle that the steering wheel was not turned far enough to actuate the signal-cancelling mechanism. In such cases, the turn signal lights may continue to flash for long periods of time while the car is being driven along the road, causing other drivers a certain amount of confusion and apprehension. This is a fairly common occurrence in the daytime, when the blinking indicator light on the instrument panel may go unnoticed because of bright sunlight.

The primary object of the present invention is to provide a warning device, which becomes operative after the turn signal has been functioning for a predetermined length of time, to alert the driver to the fact that the turn signal is still operating and should be cancelled if it is no longer needed.

A further object of the invention is to provide a warning device which is operable to sound a buzzer, or flash a warning light, after the turn signal has been functioning for a certain period of time, and which periodically interrupts the operation of the warning buzzer of light, so that the warning signal operates on-and-off, and not continuously, as in some prior warning devices. The purpose of this interrupted warning is two-fold: (1) it is less annoying to the driver than a continuous warning, when it is necessary to leave the turn signal operating for an extended period of time, as when waiting for an opening in oncoming traffic to make a left turn; and (2) an interrupted warning is more effective than a continuous warning in attracting the attention of the driver where there is a high sound level in the car, or other distracting conditions tending to blanket or mask the warning signal.

Still another object of the invention is to provide a warning device of the class described, in which the operation of the turn signal for one direction of turn has no effect whatever on the operation of the warning signal, should the turn signal switch immediately be shifted to the other direction of turn. With certain prior warning devices, a sudden shift of the turn signal from one direction to the other will cause the warning signal to operate immediately or very quickly thereafter, owing to the fact that the warning device is actuated by the turn signal switch for either direction of turn. In the present invention, the operation of the warning device for one direction of turn is independent of its operation for the other direction of turn.

These and other objects and advantages of the present invention will become apparent to those skilled in the art upon consideration of the following detailed description of the preferred embodiment thereof, reference being had to the accompanying drawings, wherein:

FIGURE 1 is a schematic drawing of the turn signal circuit in an automobile, showing a warning device embodying the principles of the invention;

FIGURE 2 is an enlarged elevational view of the actuating mechanism for the warning device, showing the two switches of the device in the normal, inoperative condition; and FIGURE 3 is a partially cut-away elevational view of one of the two switches illustrated in FIGURE 2, showing the same in operative condition.

In the drawings, the reference numeral 10 designates the turn signal system of an automobile in its entirety, which is seen to include a front left-turn signal light 11, front right-turn signal light 12, rear left-turn signal light 13 and rear right-turn signal light 14, all connected on one side to ground, and on the other side to the usual turn signal switch 15.

The turn-signal switch 15 is conventional, and may comprise four stationary contacts 20, 21, 22 and 23, arranged as shown, which are adapted to be electrically cross-connected by means of a manually-operable, rotatable switch blade 24. The switch blade 24 is connected to a flasher unit 25, which is connected, in turn, to the ignition switch 26, and the latter is connected to a battery 27, in the usual manner.

The switch blade 24 is normally centered between contacts, as shown, so that none of the signal lights 11, 12, 13 or 14 are connected to the battery. However, when the driver contemplates making a turn, and moves the handle (not shown) of the turn signal switch 15 in the appropriate direction to signal his intention, the switch blade 24 is turned in one direction or the other, so that both contacts 20 and 22, or 21 and 23, are bridged by the blade. Contact 20 is connected by wire 30 to left front light 11; contact 21 is connected by wire 31 to right front light 12; contact 22 is connected by wire 32 to left rear light 13; and contact 23 is connected by wire 33 to right rear light 14. Thus, when contacts 20 and 22 are cross-connected by switch blade 24, both the front and rear turn signal lights 11 and 13 on the left-hand side of the car are connected to the battery 27 through the flasher unit 25 and ignition switch 26, and the said lights are caused to flash at a more-or-less regular rate, to indicate to other motorists that the driver intends to make a left turn. In like manner, cross-connecting the contacts 21 and 23 causes both of the lights 12 and 14 on the right-hand side of the car to flash, signalling the intent to make a right turn. The circuit described up to this point is typical of the various turn signal systems in use at the present time.

The warning device of the present invention comprises an additional actuating unit 36 and a signalling unit 37, which may consist of either a buzzer, light, or other attention-attracting device, mounted within the car where it will be observed or heard by the driver. The presently preferred signalling device is a buzzer, which is probably the most effective signalling device for most drivers, although a flashing light would probably be more effective for any driver having impaired hearing.

The actuating unit 36 consists of two thermostatic switch units 40 and 41, which are mounted back-to-back; unit 40 being connected by a wire 42 to wire 30 going to the front left-hand turn light 11, while unit 41 is connected by a wire 43 to wire 31 going to the front right-turn light 12. Corresponding contact carrying blades 44 and 44' of the two units are connected to a common wire 36, and this is connected to a signalling unit 37. Thus, unit 40 is supplied with electrical current going to the front left-turn signal light 11, while unit 41 is supplied with electrical current going to the front right-turn signal light 12, and the output from both of the units 40 and 41 goes to the buzzer unit 37 to operate the same.

Since the two thermostatic switch units 40 and 41 are identical in construction, the following description of unit 40 applies also to unit 41, and corresponding parts of the latter unit are given the same reference numerals as in unit 40, except that they carry the prime (′) suffix.

In unit 40 there are four other spring-leaf blades, 50, 51, 52 and 53, in addition to blade 44. All five of these blades are joined together at one end, and extend generally parallel to one another in the same direction. Blade 44 is separated from blade 50 by a strip 54 of insulating material. Blades 50 and 51 lie flat against one another; and blade 51 is separated from blade 52 by a strip 55 of insulating material. Blade 52 is separated from blade 53 by a strip 56 of insulating material. The spring-leaf blades 44, 50, 51, 52 and 53, with their intervening insulator strips 54, 55, and 56, are fastened together by two tubular rivets 60 surrounded by insulator sleeves 61. Both of the units 40, 41 are mounted on a suitable support (not shown), and the two blades 53 and 53' are connected to ground.

The blade 50 is a relatively wide strip of metal, and has a central, longitudinally extending slot 67 formed therein. Blades 44, 51 and 52 are relatively narrow strips, which are considerably shorter than strip 50, and they are disposed so that they lie within the bounds of the slot 67. Thus, the blades 44, 51 and 52 are cleared by the slot 67 when the blade 50 bends one way or the other.

Blades 53 and 53' are bi-metal strips, which are constructed and arranged so that they bow in the direction shown in FIGURE 2 when cold. When heated, they tend to bend in the opposite direction, as shown in FIGURE 3. For a substantial portion of its length, each of the bi-metal strips 53 and 53' is wrapped with insulating material 62, and wound around the outside of the insulating material 62 is a fine, high-resistance heater wire 63, one end of which is spot-welded or soldered at 64 to the strip 53, while the other end is similarly connected at 65 to the adjacent blade 52.

Blade 52 has a contact 66 attached to its outer end, and this is engaged by a companion contact 70 on blade 51. On the opposite side of blade 51 is another contact 71, which is engageable with a companion contact 72 on blade 44. Normally, contacts 66 and 70 are closed together, and contacts 71 and 72 are open, as shown in FIGURE 2.

Blade 50 is a flexible strip of metal which is bent one way or the other, by the bi-metal strip 53 as the latter flexes with temperature changes. To accomplish this, the bi-metal strip 53 has a plastic block 75 attached to its outer end, and the block has a slot 76 provided therein, through which the end of the blade 50 projects, and slides freely. The block 75 thus yokes the blade 50 to the bi-metal strip 53, and the two bend together, in unison. A bowed leaf spring 80 extends between the blades 50 and 51; one leg of the spring 80 being engaged by the end of the blade 50, and the other end being engaged by the end of the blade 51. The bowed leaf spring 80 exerts a spreading force against the ends of the two blades 50, 51, and this arrangement produces a snap action when the blade 50 is bent so that the top end of spring 80 passes over the bottom end thereof. The spring 80 also holds the contacts 66 and 70 (or 71 and 72) tightly together.

The operation of my invention is as follows: When the turn signal switch is shifted to indicate a left-turn, switch blade 24 connects contacts 20 and 22, causing current to flow from the battery 27 to the two lights 11 and 13. As the current passes through the flasher unit 25, it is interrupted periodically, thereby causing the lights 11 and 13 to flash intermittently. This periodically interrupted current is also carried along wire 42 to blade 51 of unit 40, where it passes through contacts 70 and 66, along blade 52, through the high-resistance heater wire 63, and along the bi-metal strip 53 to ground. The wire 63 is heated by passage of electrical current, and with each pulse of electrical current, the bi-metal strip 53 heats up a little more, until finally the differential expansion of the two dissimilar metal laminae causes the strip to bow in the other direction, carrying the strip 50 with it. As this happens, the bowed leaf spring 80 snaps the spring leaf 51 over to its other position, opening contacts 66 and 70, and closing contacts 71 and 72, as shown in FIGURE 3. The total length of time required for the bi-metal strip to actuate the spring leaf 51, may be anywhere from 30 seconds to 2 minutes, and can be adjusted to any intermediate time interval between these limits by bending the bi-metal strip 53 to put a greater or lesser amount of bend in it.

As the spring leaf 51 closes contact 71 against contact 72, the current entering unit 40 through wire 42 passes along blade 44 and wire 46 to the buzzer unit 37, causing the latter to buzz with each flash of the turn signal lights. During the time that the buzzer 37 is being sounded, the circuit to heater wire 63 is open, and therefore the bi-metal strip 53 begins to cool off. As it cools, the strip 53 straightens out and finally returns to the bowed condition shown in FIGURE 2, at which point the spring 80 again snaps the blades 51 upward, so that contact 70 engages contact 66 and the cycle begins all over again. The cooling-off period of the cycle, during which the buzzer 37 continues to sound, lasts for anywhere from 5 to 20 seconds. Thus, the buzzer may wait from 30 to 2 minutes before sounding the first time, and then continues to sound intermittently thereafter, with intervals of silence.

When the turn signal switch is shifted to the other position, contacts 21 and 23 are connected together by the switch blades 24, and right turn lights 12 and 14 are caused to flash. Current from wire 31 is carried by wire 43 to unit 41, where the resistance wire 63' is heated up, causing the bi-metal strip 53' finally to open contacts 66' and 70', and close contacts 71' and 72'. This now sends current along blade 44' to the buzzer 37, to sound the latter. Here again, the operation of the buzzer continues until the bi-metal strip 52' cools off and returns the blade 51' to its original position, at which point the cycle begins all over again.

While I have shown and described in considerable detail what I believe to be the preferred form of my invention, it will be understood by those skilled in the art that various changes may be made in the shape and arrangement of the several parts without departing from the broad scope of the invention as defined in the claims that follow. For example, the wires 46 and 46' leading from the switches 40 and 41, might be connected to a relay, which would then close a direct circuit from the battery 27 to the buzzer 37. This would relieve the twin signal flasher unit 25 of some of the electrical load of the warning system 36, 37, and would eliminate any need for replacing the flasher unit 25 with a heavier duty unit.

I claim:

1. A warning device for use in a vehicle having right turn and left turn signal lights, a flasher unit connected to both of said signal lights, and a manually operable turn signal switch for selectively sending current through said flasher unit to one or the other of said signal lights, said device comprising:

a warning signal device disposed within said vehicle to attract the driver's attention when activated;

a resilient switch blade having a fixed end and a movable end;

first and second stationary contact points disposed on opposite sides of said resilient switch blade and alternatively engageable thereby when said switch blade is bent in one direction or the other;

a bi-metal strip having a free end that is movable between a first position when the strip is cool, and a second position when the strip is hot;

a heater wire wrapped around said bi-metal strip and electrically connected at one end to said first stationary contact point;

means operable to close said resilient switch blade against said first stationary contact point when said free end of said bi-metal strip is at said first position, and against said second stationary contact point when said free end of said bi-metal strip is at said second position;

an electrical connection between said resilient switch blade and at least one of said turn signal lights; and an electrical connection between said second stationary contact point and said warning signal device;

said warning signal device being activated, after said turn signal lights have been flashing for a predetermined interval of time, by movement of the free end of said bi-metal strip from said first position to said second position responsive to being heated by said heater wire, and thereafter producing a warning signal with each flash of said turn signal lights, until said bi-metal strip has cooled off and returned to said first position.

2. A warning device for use in a vehicle having right turn and left turn signal lights, a flasher unit connected to both of said signal lights, and a manually operable turn signal switch for selectively sending current through said flasher unit to one or the other of said signal lights, said device comprising:

a warning signal device disposed within said vehicle to attract the driver's attention when activated;

movable contact means;

means for supplying a pulse of electric current to said movable contact means with each flash of said turn signal lights;

first and second stationary contact points disposed on opposite sides of said movable contact means, and alternatively engageable thereby;

a bi-metal strip having a heater wire closely adjacent thereto, one end of said heater wire being connected to said first stationary contact point;

said second stationary contact point being electrically connected to said warning signal device;

said bi-metal strip being operable to close said movable contact means against said first stationary contact point when the bi-metal strip is cool, and against said second stationary contact point when the bi-metal strip is hot;

said bi-metal strip being gradually heated by intermittent pulses of electrical current from said movable contact means passing through said first stationary contact to said heater wire, until said bi-metal strip causes said movable contact means to separate from said first stationary contact point and close against said second stationary contact point;

said warning signal device being thereafter caused to make a warning signal with each flash of said turn signal lights until said bi-metal strip has cooled off and returned to its original position.

3. A warning device for use in a vehicle having right turn and left turn signal lights, a flasher unit connected to both of said signal lights, and a manually operable turn signal switch for selectively sending current through said flasher unit to one or the other of said signal lights, said device comprising:

a warning signal device disposed within said vehicle to attract the driver's attention when activated;

an actuating mechanism for said warning signal device consisting of two thermostatic switch units;

each of said thermostatic switch units having a movable contact means and first and second stationary contact points disposed on opposite sides thereof;

each of said thermostatic switch units also having a bi-metal strip having a heater wire wrapped around it, with one end of said heater wire attached to the first stationary contact point;

the movable contact means of one of said switch units being electrically connected to the left-turn signal light, and the movable contact means of the other of said switch units being electrically connected to the right-turn signal light;

said second stationary contact points of both of said switch units being connected to said warning signal device;

said bi-metal strip of each of said switch units being operable to close its associated movable contact means against the corresponding first stationary contact point when the bi-metal strip is cool, and against the corresponding second stationary contact point when the bi-metal strip is hot;

said bi-metal strip being gradually heated by intermittent pulses of electrical current from its respective turn signal light through said movable contact point and said first stationary contact point to said heater wire, until said bi-metal strip causes said movable contact means to separate from first stationary contact point and close against said second stationary contact point; and said warning device being thereafter caused to make a warning signal with each flash of the associated turn signal lights until said bi-metal strip has cooled off and returned to its original position.

References Cited by the Examiner

UNITED STATES PATENTS

| | | | |
|---|---|---|---|
| 2,060,831 | 11/1936 | Smith | 340—75 |
| 2,574,869 | 11/1951 | Green | 200—122 |
| 2,814,686 | 11/1957 | Wilder | 200—122 |
| 2,830,284 | 4/1958 | Keegin | 340—75 |
| 2,840,667 | 6/1958 | Atchison et al. | 200—122 |
| 2,896,190 | 7/1959 | Gallaro et al. | 340—75 |

NEIL C. READ, *Primary Examiner.*

T. A. ROBINSON, *Assistant Examiner.*